(12) United States Patent
Kim et al.

(10) Patent No.: US 9,419,903 B2
(45) Date of Patent: Aug. 16, 2016

(54) STRUCTURE FOR IMPLEMENTING OPENFLOW ALL GROUP BUCKETS USING EGRESS FLOW TABLE ENTRIES

(71) Applicant: Texas Instruments Incorporated, Dallas, TX (US)

(72) Inventors: Hun-Seok Kim, Dallas, TX (US); Patrick W. Bosshart, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 148 days.

(21) Appl. No.: 14/072,985

(22) Filed: Nov. 6, 2013

(65) Prior Publication Data

US 2014/0328180 A1    Nov. 6, 2014

Related U.S. Application Data

(60) Provisional application No. 61/724,098, filed on Nov. 8, 2012.

(51) Int. Cl.
*G06F 11/00* (2006.01)
*H04L 12/819* (2013.01)

(52) U.S. Cl.
CPC ..................................... *H04L 47/21* (2013.01)

(58) Field of Classification Search
CPC ....... H04L 45/745; H04L 47/56; H04L 49/00; H04L 45/38; H04L 2212/0025
See application file for complete search history.

(56) References Cited

U.S. PATENT DOCUMENTS

| 5,265,088 | A  | * | 11/1993 | Takigawa | H04L 49/107 370/249 |
| 2013/0128746 | A1 | * | 5/2013 | Yedavalli | H04L 45/38 370/238 |
| 2014/0105216 | A1 | * | 4/2014 | McDysan | H04L 67/1095 370/400 |

OTHER PUBLICATIONS

Specification Version 1.1.0 Implemented (Feb. 28, 2011).*

* cited by examiner

*Primary Examiner* — Yemane Mesfin
*Assistant Examiner* — Abdelillah Elmejjarmi
(74) *Attorney, Agent, or Firm* — John R. Pessetto; Frank D. Cimino

(57) ABSTRACT

An embodiment of the invention includes an Openflow switch. The Openflow switch includes Openflow ALL groups. The Openflow ALL groups include ALL group buckets. During ingress ALL group buckets are represented in ingress as a list of output ports with associated queue ID's and associated copy-counts. Each ALL group bucket is represented in egress by an egress Openflow table entry where the egress Openflow table entry matches a group ID and a bucket ID. An action entry in an ALL group bucket table entry is the set of actions in the Openflow ALL group bucket excluding an output port and queue assignment.

8 Claims, 8 Drawing Sheets

STRUCTURE FOR IMPLEMENTING OPENFLOW ALL GROUP BUCKETS USING EGRESS FLOW TABLE ENTRIES

This application claims priority from Provisional Application No. 61/724,098, filed Nov. 8, 2012.

BACKGROUND

Openflow is a networking communications protocol which separates the control and data planes of packet processing, enabling simpler and more efficient high speed data plane processing, and allowing the control processing of entire networks to be centralized under the control of a single software program. It is one of the enablers of Software Defined Networking. It is a stated goal of Software Defined Networking (SDN) to increase the flexibility and programmability of networks allowing users to more easily tailor networks to their needs.

Briefly, Openflow (OF) defines an Openflow switch to contain a series of associative flow tables. Each entry in a table contains ternary values (0, 1, or dont-care for each bit) for a desired selection of packet fields, such as MAC source and destination addresses, IP source and destination addresses, TCP port numbers, etc. Openflow defines a number of standardized packet header fields for matching as well as allowing users to add their own custom fields. Table entries are in prioritized order, and for each individual packet processed by the Openflow switch, the table entries are searched in order for a matching entry. Note that table entries can have ternary values (don't-care for some or all bits) to match a broad selection of packets. When the first table match is found, a set of actions associated with that table entry is executed. These may modify fields of the packet, for example, by setting the MAC destination field to a new value, they may direct the Openflow switch to output the packet to a particular switch port in a particular queue, or send it to the Openflow software controller, or drop the packet. It is generally intended that when the existing flow tables don't know how to handle a packet, it is sent to the controller, which may respond by installing rules on the switch to properly process similar packets. This accomplishes the goal of control and data plane separation by having the Openflow controller software make the decisions concerning what flow tables to install, whereas the switch simply follows the directives of the controller instead of making complex behavioral decisions on its own.

In general, Openflow is defined to be able to flexibly match against packets, and directed by the matches, perform a comprehensive set of actions to modify the packet and decide what to do with it. This is done with a number of tables which operate on the packet sequentially.

When a packet enters a network switching device, it may be considered to be in one of two categories, depending on the number of destinations it is sent to by the device. Unicast packets are sent out one port to a single destination, whereas multicast packets are sent to multiple destinations. These multiple destinations may each get differently modified copies of the packet, and may be sent out different output ports. The process of sending multicast packets to multiple destinations, potentially each with a separately modified copy of the packet, is known in the industry as multicasting.

Another feature of Openflow is Openflow groups. There are several group types, but the ALL group is one of interest. The actions taken as a result of a match can include a group. A group is a container containing a number of buckets, where each bucket in turn is a set of actions. This set of actions is similar to the actions executed by any table match, so this in general defines a recursive capability, where instead of doing just a single set of actions, there are multiple sets of actions. Groups can even be contained within groups by being in the actions of any group bucket. In the ALL group, each bucket is executed on a separately created copy of the packet. Each action in that bucket is executed on that bucket's copy of the packet. It is typically then output to a particular switch port into a specific queue, as directed by its actions. Each bucket may output to a different switch port. The end result of an ALL group is to produce a number of copies of a packet, each separately modified, and each potentially sent to a different destination port and queue.

Openflow ALL groups implement multicasting; the sending of a packet from one input port source to multiple output port destinations. Multicasting is a common and important function of switches. Multiple buckets may also send their own copies of the packet to the same output port; there is no requirement that each copy go do a different output port. So in general, as a result of ALL group processing, the packet may send multiple separately modified copies of the packet to each of several output ports.

Another group type, fast failover, chooses the first bucket of the group which is associated with a live port. If a switch has the capability to detect when links to its neighbors are inoperative, and respond by marking them as not live, then failover groups immediately respond by sending packets to an alternative destination. This improves the responsiveness of OF switches to the hardware failures which inevitably occur in large systems.

There are other OF group types. The select group chooses one of the several buckets to execute (instead of all of them in an ALL group). The choice of which bucket is outside of the definition of OF, but it is commonly done as a pseudorandom choice made by hashing on different packet header fields. So packets with different headers will randomly go to different destinations, while packets with identical headers will always go to the same destination together. In the example of a switch processing multiple video streams, each of which is its own flow with a specific set of values for its header fields, different flows would be pseudorandomly routed to different destinations, while all members of any flow would always go to the same destination. This feature is used to implement Equal Cost Multipath (ECMP), which gangs together several paths to achieve higher total bandwidth, with packets from different flows randomly assigned to each path to distribute the workload among the paths. It is desired that packets from the same flow be routed to the same destination, so that at the final destination packets arrive in order.

DETAILED DESCRIPTION

An embodiment of the invention includes an Openflow switch. The Openflow switch includes Openflow ALL groups. The Openflow ALL groups include ALL group buckets. During ingress ALL group buckets are represented in ingress as a list of output ports with associated queue ID's and associated copy-counts. Each ALL group bucket is represented in egress by an egress Openflow table entry where the egress Openflow table entry matches a group ID and a bucket ID. An action entry in an ALL group bucket table entry is the set of actions in the Openflow ALL group bucket excluding an output port and queue assignment.

Figure 1:
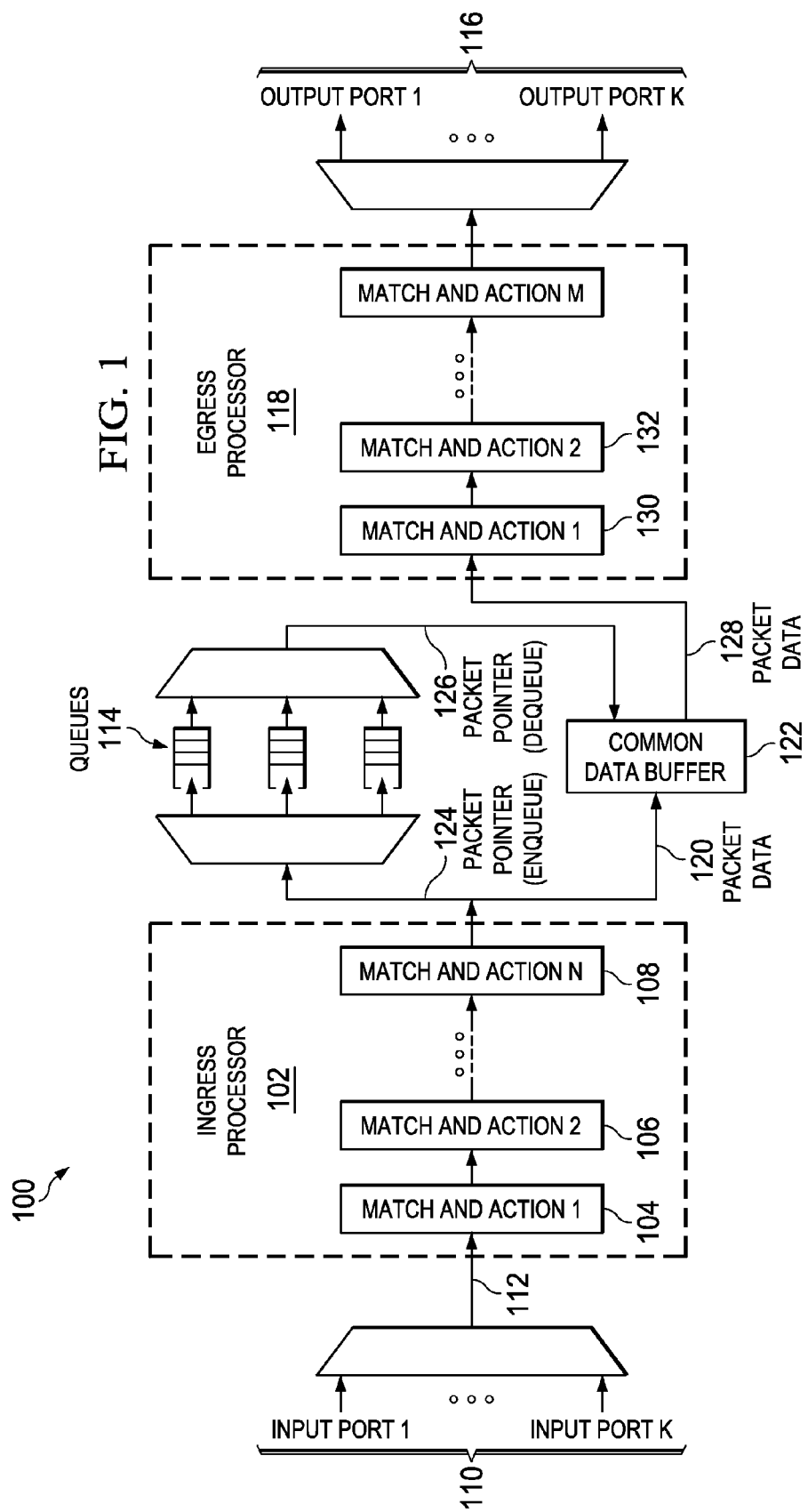
FIG. 1 is an electrical diagram, in block form, of a hardware switch architecture constructed according to embodiments of the invention.

In a hardware switch, difficulties associated with multicasting often are first order determinants of the architecture of the switch. A basic hardware switch architecture is shown in FIG. 1. It has an ingress processor 102 with a number of Openflow Match-Action stages 104, 106 and 108 which implement the matching and resulting actions described above. This match-action pipeline 100 may be shared by multiple input ports 110 by multiplexing those ports into the pipeline input 112 in round-robin fashion. When the pipeline 100 is finished processing, there are several options. Unicast packets, which have one destination, are put into an output queue for a single output port. Multicast packets are put into the queues 114 for several output ports, as described above. The pipeline 100 may choose to drop the packet and not output it to anywhere, or send it to the Openflow controller, which is in some ways similar to just another output port, but otherwise is not relevant to this discussion and won't be described further. These outcomes are all determined by table actions specifying an output port and queue, or by an ALL group specifying multiple destinations, or other table actions specifying drop (lack of any output port assignment) or output to controller.

Typically each output port 116 is serviced by several queues 114. To output a packet to a particular port 116, the egress processor 118 may choose a packet from any of its queues 114. A common feature of queues 114 is an associated priority. The egress processor 118 may choose its packet from the highest priority occupied queue. There may also be limits such that any queue doesn't get more than a particular fraction of the overall bandwidth. These queue features are commonly used to implement Quality of Service (QoS) capabilities. For example, delay-sensitive video traffic may be placed in a higher priority queue than low priority bulk data transfer traffic. Video may then be limited to some fraction of the overall bandwidth, for example 75%, so that the lower priority data transfer traffic gets some bandwidth and isn't starved out. In that way, when there is contention for the output bandwidth, it can be allocated as desired. Queue systems can be more complex than this, featuring a hierarchy of queues, but in general operate using priorities, max rate limits, and min rate bandwidth guarantees.

Packets vary significantly in size; a minimum sized packet may be 64 bytes, while large ones can be up to 1.5 Kbyte or even over 9K bytes or larger in size. As a result, packets are typically broken up into data cells 120, and stored in a common data buffer 122 as a linked list of these cells, where a pointer associated with each data cell provides the address of the next data cell in the packet. The entire packet may be referenced by the pointer to its first data cell, called a packet pointer 112. The associated action of putting a packet into an output queue for a particular port is actually just putting the packet pointer into the queue. Concurrently, the packet 120 itself is stored in the common data buffer 122.

If the architecture of FIG. 1 is instantiated into a particular switch, it has a specific number of input ports each at a specific bandwidth. The bandwidth through the match-action pipeline is the sum of the bandwidths of the input ports 110. When packets are unicast, and therefore each packet outputs to a single output port and queue, that bandwidth is roughly maintained from the output of the match-action pipeline into the data buffer 120. There are two aspects to bandwidth. Maximum bit rate is the sum of the bit rates of all the input channels. For a 64 port switch, where each channel is 10 Gb/s, the input bandwidth is 640 Gb/s. The other aspect of bandwidth is packet rate. For a channel with a particular bit rate, the packet rate is maximized when the packets are of minimum size. At 64 channels of 10 Gb/s, with minimum 64 byte packets, the maximum packet rate through the match-action pipeline is approximately 960M packets/s (note there is some space between packets, effectively increasing the minimum packet size to above 80 bytes).

So when the switch of FIG. 1 is processing unicast packets, the bit rate required to write data into the common data buffer 120 is roughly the same as the total input bit rate. The rate at which packet pointers 124 are written into the queues 114 is the packet rate, the sum of the packet rates of all the input channels.

The requirements for processing multicast packets are more severe. If for example, a packet from one input port broadcasts to all other ports (for example 63 others), then the architecture of FIG. 1 has to write 63 separate copies of the packet into the common data buffer in the time it would have to only write one packet in the unicast case. This is referred to as requiring a 63× over speed. Also, packet pointers 124 have to be written to 63 queues instead of one in the unicast case. Furthermore, this covers the case where there is one copy of the packet sent to each of the 63 output ports, but not when multiple copies of the packet are sent to each port.

In general, it is desirable to optimize the match-action pipeline for the total input bandwidth, and requiring it to output packet copies much faster (63× in this example) is an unreasonable request which will result in a far more expensive, sub optional implementation.

Figure 2:
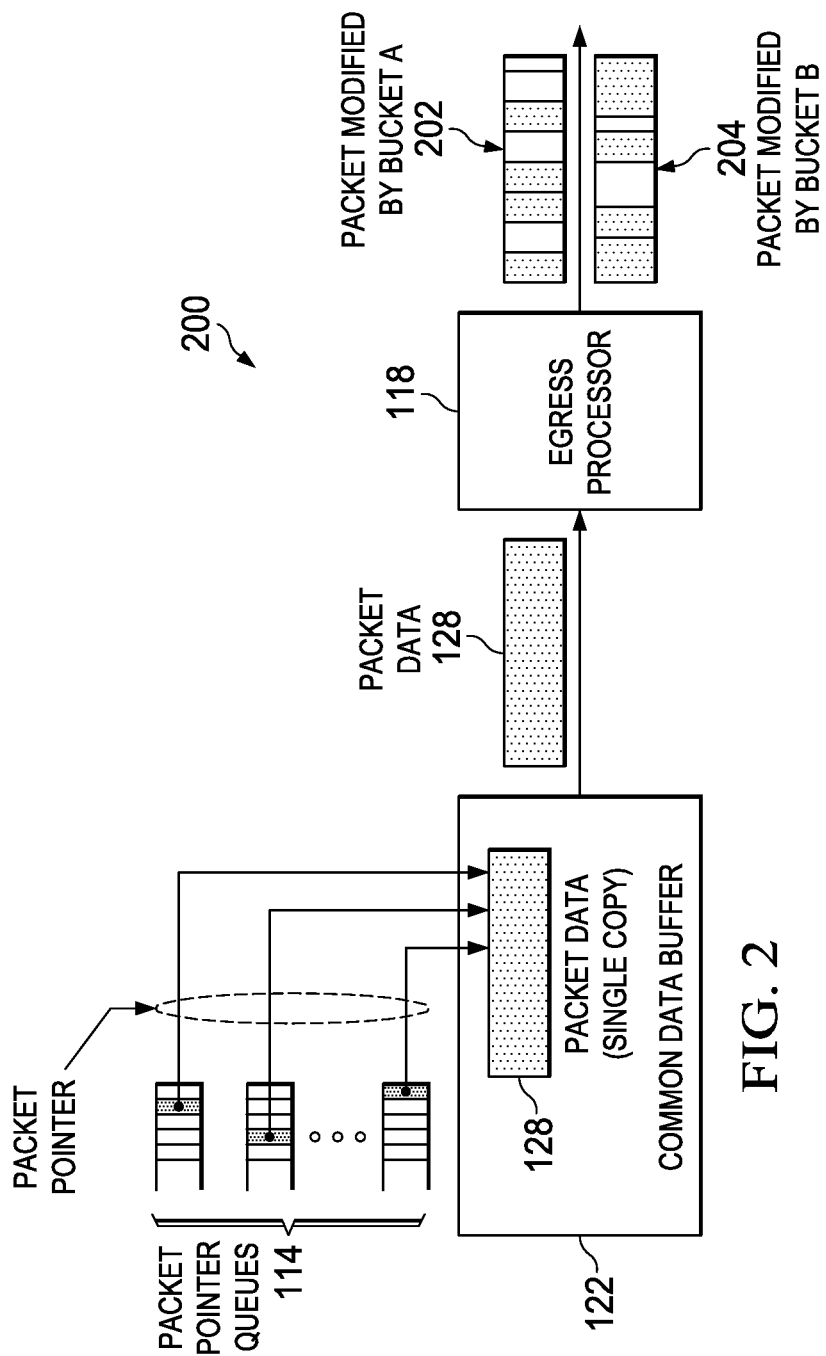
FIG. 2 is an electrical diagram, in block form, illustrating how to store a single copy of a packet in a common data buffer before it is separately modified by each bucket according to embodiment of the invention.

It is preferable to store a single copy of the packet in the common data buffer 124 before it is separately modified by each bucket, and then do the bucket modifications in the egress processor 118. This is illustrated in FIG. 2. In the last match-action stage 108, the ALL group must represent the buckets contained in the group. It must store the portion of the bucket actions which assign the packet to a particular port and queue. But all the other actions associated with the bucket are moved to the egress processor 118. These are the actions which modify the packet separately for each output. Now only one copy of the packet must be stored in the common data buffer 122, pointed to by a single packet pointer 126. Note that in the match-action pipeline, each group bucket still needs to enque the packet into a number of output ports' queues. The single packet pointer for the packet will be enqueued into each of the several output ports' queues.

In the case where the group has multiple packet copies outputting to the same port, rather than putting multiple entries into the output queue of that port, only one entry can be enqueued, along with a number representing the number of copies of that packet to be output before that entry is dequeued. This feature means that at most one copy of the packet pointer 124 needs to be enqueued for each output port. But still, a separate copy needs to be enqueued for each port (63 in the above example).

For unicast data, once a packet 128 is read out of the common data buffer 122 into the egress processor 118, those data cells containing that packet 128 can be freed for future use. For multicast data, that same packet data 128 is used multiple times. A copy-count field must be stored associated with that packet, which gets initialized to the number of total copies the packet will output, and which gets decremented each time a copy of that packet is output. When the copy-count reaches zero, all copies of the packet have been output, and the data cells containing that packet can be freed for future use.

As a result, the structure required in the ingress match-action stage 102 to implement an ALL group is a list of buckets, where for each bucket the output port and output queue is maintained. If the queue ID is the same for all output ports, then it may be stored only once for the whole ALL group. In the egress processor 118, each bucket is represented by the remainder of the actions after the port and queue assignment has been removed. In light of the requirement to output multiple copies of a packet to the same port, the ingress match-action stage 102 ALL group buckets contain at most one entry for each output port, along with a number stating how many copies of the packet go to that output port.

The implementation of the group buckets in the egress processor 118 is to organize them into an Openflow table, where each bucket is realized by an Openflow table entry, where the actions in each bucket are expressed as the Openflow table entry's actions, and the individual entries are accessed by matching against the group ID and an indicator of the bucket ID. There are two inventive representations of the bucket ID. One is simply obtained by numbering all the buckets of a group sequentially, giving each bucket a unique number. Another recognizes that the output port assignment, which is carried in the packet queue entry and made available as a match field in the egress processor, is already an ID which discriminates between packet copies destined for separate output ports. All group buckets for each output port are numbered sequentially, and that port-index-ID, together with the port number, serve to identify the bucket.

As an example, if an Openflow ALL group G had a total of 6 buckets, one outputting to port A, two to port B and three to port C, the ingress match-action stage 102 implementing the ALL group would have three entries, the first stating the (output-port, number of copies) as (A,1), the second entry would be (B,2) and the third would be (C,3). In the second inventive implementation of Openflow group buckets using egress match-action tables, there would be an Openflow table in egress containing the 6 entries below:

| group | port | port-index-id |
|-------|------|---------------|
| G     | A    | 1             |
| G     | B    | 1             |
| G     | B    | 2             |
| G     | C    | 1             |
| G     | C    | 2             |
| G     | C    | 3             |

This table may also contain entries for other ALL groups.

So in the egress group table, the fields matched would be the group ID and the bucket number in the first realization. It would be the group ID, the output port number, and the port-index-ID in the second realization. There may be any number of ALL groups, and all of their egress buckets can be organized into a single Openflow table. Once a group bucket has been matched in this way, the actions associated with the table entry are executed.

Note that an ALL group can output more than one copy of a packet to any individual port. This capability is implemented by storing in the ingress ALL group a list of buckets, where for each included output port only one bucket is provided, and in that bucket is a field which states the number of copies output to that port. When the packet pointer is enqueued into the queue for that output port, the field describing the number of copies for that port is stored with it, the per-port copy-count. As a result, no matter how many copies of a packet get sent to a particular output port, the packet pointer is enqueued only once for that output port. This requires that each copy is put into the same queue for that output port. Then when the egress processor 118 outputs that item from the top of the queue, it reads the per-port copy-count field, and outputs the packet that number of times before retiring that entry from the top of the queue. The index number describing the current iteration number of the copy-count field is also sent to the egress processor as a field on which the Openflow tables can match.

As a result of the inventive implementation, it is possible to implement Openflow ALL groups without specific dedicated structures for containing the packet modifying actions of the groups. Instead, existing match-action structures 104, 106, 108, 130, 132 and 134 are used. This leads to a simplification of the design.

Note that though it is not specified in the Openflow 1.3 standard, it is possible to continue doing further Openflow match-action operations in the egress pipeline. If this is done, it uses a set of hardware resources, for example memory to store match and action table entries, and the table used by the ALL group buckets uses some of this resource. It is just an Openflow table like any other egress table. In this inventive implementation, ALL group buckets and egress match-action tables share common resources, and so the user can apportion them as desired between ALL group buckets and egress match-action tables. Note further that if Openflow table hardware resources are shared between the ingress match-action tables and the egress match-action tables (including ALL buckets), then the ALL group buckets are taken from a pool of even larger resources. When implementing hardware switches, tables are resources which consume area, for memories for example, and are a limited resource. Providing a single resource which can be apportioned as desired by the user between ingress Openflow tables, egress Openflow tables and ALL group egress tables, is more desirable than partitioning the resources in hardware into fixed portions for each of these portions of the architecture.

Figure 3:
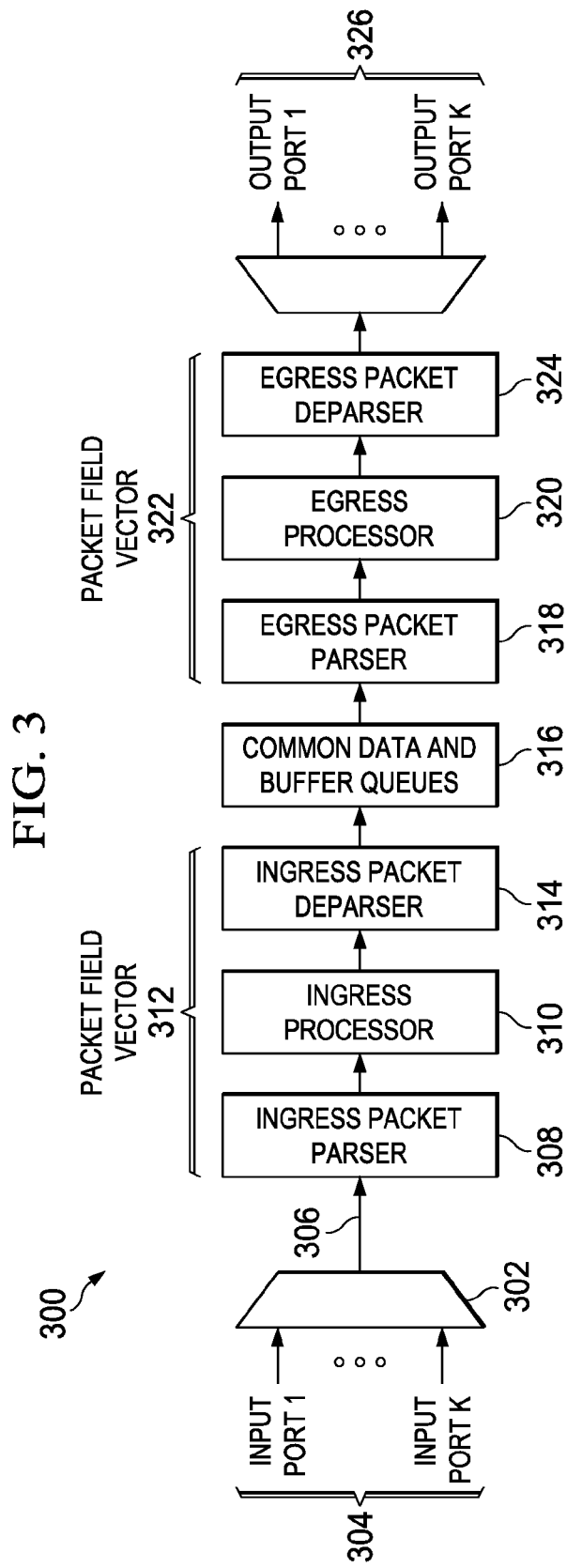
FIG. 3 is an electrical diagram, in block form, of a hardware switch architecture constructed according to embodiments of the invention.

FIG. 1 shows the ingress processor 102 implemented as a series of Openflow match and action stages 104, 106 and 108, and the egress processor 118 likewise implemented with a series of match and action stages 130, 132 and 134. FIG. 3 shows a higher level block diagram 300, starting with an input multiplexer 302 which rotates among several input ports 304, providing packet data 306 to an ingress packet parser 308. This parser 308 translates the representation of the incoming packet into one where header fields of the packet are put into standardized locations in a packet field vector. For example, the packet field vector 312 has predetermined locations for all packet header fields, like MAC source and destination addresses, ethertype, IP source and destination addresses, IP type, TCP input and output port numbers, VLAN and MPLS tag fields, etc. Any individual packet may or may not contain specific fields, but if the packet does contain the field, it is put into the predetermined location for that header field in the packet field vector. For example, if the IP type of a packet is not TCP, it will not contain TCP port numbers. While individual packet header fields may be in different locations in the packet, the parser always puts them into the same location in the packet field vector. For example, a VLAN tag is 4 bytes wide, and will put all subsequent fields, like IP and TCP headers, 4 bytes farther into the packet if it is present compared to when it's absent. But considering an IP source address field for example, while it is in different positions in the packet given the presence or absence of a VLAN tag, it is always in the same position, or slot, in the packet field vector. Note that the packet field vector requires a bit for each slot contained in it to specify whether there is data in that slot or not. For example, if the packet contained a VLAN header, the valid bit would be set to one for the slot representing VLAN in the packet field vector 312, otherwise it would be zero.

According to the 7 layer OSI packet protocol specification, packet header fields correspond to layers of the model. MAC is layer 2, IP is layer 3, TCP is layer 4, etc. Generally, layer numbers increase progressing further into the packet. But sometimes a packet is encapsulated, using any one of a number of existing standards (for example, VXLAN, GRE, NVGRE, or PBB). In that case, the packet may progress up to a certain layer (3 for example) with the encapsulating fields, then start all over again at layer 2 with the original packet contents. In that case, there may be multiple copies of fields at a particular layer (two copies of layer 2 and 3 in the example above). The two versions of a layer are generally referred to as inner and outer. There may be more than two copies if the packet is encapsulated multiple times. There may also be multiple copies of tag headers such as VLAN or MPLS, which can again be referred to as outer and inner, or innermost. There are many types of encapsulations using varying layers, but they all have in common the presence of inner and outer versions of some of their fields.

To represent packets which have multiple copies of a header or are encapsulated, there will be multiple places in the packet field vector 312 which store the same field type (like IP destination). The outermost copy will be in one predetermined location, the next outermost will be in a different location, and so on for each copy of the header. Each copy will have its own associate valid bit. These fields can also be referred to as nested fields.

Generally, while the field assignments into the packet field vector 312 are predetermined, they are not hardwired and inflexible in a hardware implementation. Generally, they are programmed into the parser as software or firmware, directing the parser to deposit each recognized field into a specific output location.

Other data may be put into the packet field vector 312 for use by the ingress processor 310. This could include the input port number of the switch for example. Other locations may be specified for internal use by the ingress processor 310, for example as locations to set with a value which may be used by later processing of the packet.

The packet field vector 312 is made of a number of fixed width slots, for example of one number of one byte slots, a second number of two byte slots, and a third number of four byte slots. Larger fields in the packet, for example 128 b IPV6 sources or destinations, could populate several packet header field slots, for example 4 32 b slots for IPV6 addresses. Fields with widths which don't exactly match the provided slot widths could populate a number of different slots which sum to the required width. For example, a 48 b MAC source or destination address could populate a 16 b and a 32 b packet field vector slot.

The ingress processor 310 may modify fields of the packet. For any given field, it does so by setting a value into that field's location (slot or slots) in the packet field vector. It may add a field by putting data into that location in the packet field vector and setting that location's valid bit to one. It may delete a field by setting that location's valid bit to zero. It may modify the outer, innermost, or any specific copy of a nested field, since each copy has its own predetermined location. It can also do complex operations which break down to multiple of these types of operations.

The parsed packet format used by the packet field vector 312 will in general require more bits to represent than an individual packet will contain. While an individual packet holds some particular set of headers, the packet field vector must be large enough to represent all possible header combinations the switch expects to process. Note the parser may decide to only parse fields that the switch expects to be using for processing. For example, if the switch only uses MAC addresses (at layer 2), layer 3 and above headers (IP, TCP etc) are simply considered data and don't need to be parsed into the packet field vector.

The ingress processor outputs its modified packet into the common data buffer. But before doing so, the packet must be formatted back into standard ethernet packet format from the packet field vector, essentially undoing the parsing action of the parser. This is done by the ingress packet deparser 314. This keeps the volume of data to write into the common data buffer approximately the same as the volume of incoming data. Without the deparser 314, many short packets with simple headers would have to write much longer header information, consisting of the full packet field vector data width.

When the egress processor 320 chooses a packet from a particular output port's queue, it first must parse it, again into the format of the packet field vector 322. Then the egress processor 320 does whatever packet modifications apply to this packet, following which the packet is again deparsed 324 into standard ethernet format and output.

Figure 4:
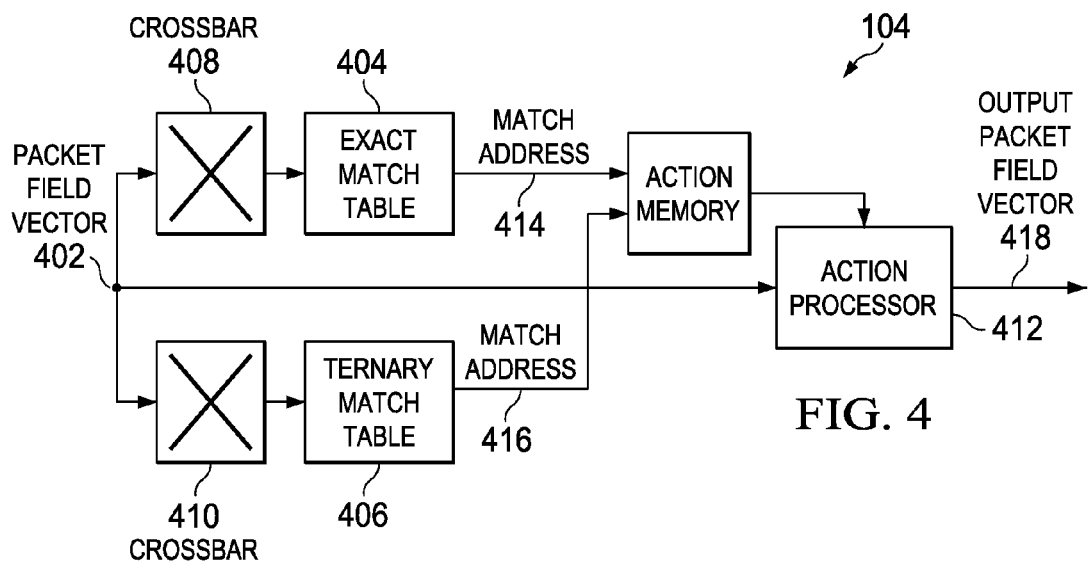
FIG. 4 is an electrical diagram, in block form, of a single match and action stage constructed according to embodiments of the invention.

FIG. 4 shows a single match and action stage 104 of FIG. 1. The match and action stage 104 inputs a packet field vector. Recall that the Openflow specification declares a number of sequential tables, each of which can be used to match against an arbitrary subset of all the packet header fields (as well as other fields, generally referred to as metadata, which are also contained in the packet field vector). FIG. 4 shows two matching tables, an exact match table 404 and a ternary match table 406. An exact match table 404 contains entries which have to exactly match its input data pattern from the packet, bit for bit, whereas a ternary table 406 has entries where each bit can be 0, 1 or dont-care, enabling it to match a large number of individual header field combinations with a single entry. In order to select a specific set of fields to match, at the input to each of the exact 404 and ternary 406 match tables is a crossbar 408 and 410. A crossbar 408 and 410 has a number of input fields and a number of output fields, where generally each output field can select any of the input fields. It is therefore a collection of multiplexers, one for each output field.

Generally, ternary tables 406 can be implemented using TCAMs (ternary content addressable memories). These memories store a number of ternary entries, and accept as input a ternary search word. They compare each location for a ternary match to the search word, and output for each location whether there was a match or not. A ternary match for a bit succeeds if the bits match, or either the stored data bit or the search bit is a dont-care. The matches output from each stored word may optionally be combined by a prioritizer to output the address of the highest priority match, where priority is ordered by the address of each entry in the TCAM. Or the TCAM may simply output the vector of match indications, in which case the prioritization is done by external logic. In either case, the ultimate result is an indication of whether a match occurred, and the address of the highest priority match. Sometimes an additional output is desired to indicate whether more than one entry matched, though that isn't used in this application of TCAMs.

Exact match tables are implemented by using SRAMs as hashtables. Generally a hashtable takes some or all of the input bits of a search word, and generates a pseudorandom, but predictable, number from those bits. One method of hashing generates an N bit address from an M bit input, where for each of the N hash output bits, a separate M bit mask is and'ed with the input data, then the parity of the result is taken. The input bit mask for each hash output bit is different, and there are methods known in the art to select masks with desirable properties. There are multiple methods of generating hash addresses known in the art, but all of them attempt to generate an address, where for all data inputs, the addresses end up uniformly distributed across the N bit address space. Hash tables operate by accessing an array of data at that hashed location, and checking to determine whether it is the desired data. Hash tables also have to contend with the possibility of address collisions, where multiple distinct inputs hash to the same address. There are many techniques known in the art for accomplishing this. Multiway hashing addresses this by making K hash addresses instead of one, and looking up the data in those K separate locations. Cuckoo hashing further refines this by moving around existing entries to make space for new entries. When one or more entries are retrieved from the hashed locations, they are compared against the search data to determine if they match. The search entries can be stored in RAM and search data input, and it can be determined what location, if any, matched the search data. Likewise, hashtables implemented in hardware may include additional logic, such as a number of match entries used as overflow locations when hash collisions prevent an entry from being installed in the table. Additional logic such as this is also known art, and is included in the definition of making a hashtable using RAMs.

Both the exact match 404 and the ternary 406 match units must match slots of the packet field vector 402. They must match not only the values of data in the slots, but the presence or absence of data as indicated by the slot's associated valid bit. Note that in a ternary match it is possible for a match entry to have a dont-care for the valid bit as well as for the data bits.

The exact match 404 and ternary 406 match units each output an indication of whether there was a match, and if so, its match address 414 and 416. When a unit matches, its address is used to look up an entry in the action memory 412. This action entry contains instructions and data for modifying the packet, for outputting it to a particular port and queue, for group operations, and for providing the index of the next Openflow table to use. These actions are specified in the Openflow standard. While in general, the actions provide the capabilities required by the Openflow standard, the correspondence between the standard and the implemented actions may not be exact. For example, Openflow can specify a virtually unlimited number of individual actions from a match, whereas hardware has a limit to the number of operations it can perform. Conversely, the actions provided can constitute a superset of those required by Openflow. For example, it is advantageous to include as many as possible instructions which correspond to those found in general purpose microprocessors. This refers to the general capabilities of the instructions, for example the ability to do move, copy, arithmetic, logical and compare operations, rather than to an exact correspondence to a particular processor's instruction set. In this way, a general capability is produced to implement a large variety of potential actions.

The actions specified by a match will modify the contents of the packet field vector 402. Some operations, such as move, add, and shift, will use the current values of some locations as sources, whereas other operations, like set a value to a constant specified in the action memory, do not use the incoming value of field vector locations, they just set output values.

An individual Openflow match and action stage contains a specific amount of exact match 404 memory and a specific amount of ternary 406 match memory. Given that ternary match memory using TCAM is more expensive in terms of silicon area than exact match memory using SRAM, it is likely advantageous to include more exact match memory capacity than ternary match capacity.

Each memory is organized into W words by B bits, where the word and bit sizes of ternary and exact match memory do not have to be equal. In general, the bitwidth B is set large enough to match against the widest set of fields anticipated for use. Openflow 1.0 defines a set of match fields which sum to 340 bits in width, so the width B is generally in the hundreds of bits.

While the table width may be hundreds of bits, it is anticipated that many matches desired by users will be substantially less than 340 bits in width. One of the goals of later Openflow releases, starting with 1.1, is that providing multiple tables will allow the user to make each table serve a more specific and limited function, requiring the inputting of a smaller set of input fields to match. A match table hundreds of bits wide would therefore often have many or most of its bits unutilized. To address this problem, both the exact 404 and ternary 406 match tables can be configurable. By splitting the memory into several chunks of smaller bitwidth, each becomes a separately functioning set of table entries which can be combined into a table with a larger number of words. For example, splitting a W entry 340 bit table in half widthwise could be used to create a 2W entry 170 bit table. Splitting it in fourths could be used to create a 4W entry, 85 bit table, etc. The same concept can be applied to ternary match memory.

When tables are split into narrower ones, instead of merging them into a table with a larger number of entries, they can be used to create separate tables. Or they could be combined in groups to create a variety of different configurations. For example, a table of W entries and width B, when split into fourths could create a table of W entries and B/2 bits, along with two tables of W entries and B/4 bits. Or as another example, it could make a table of W entries and B/2 bits and a table of 2W entries and B/4 bits.

In the case where a user desires an exact match 404 or ternary 406 match table with size larger than the provided capacity of the single Openflow match and action stage 104 of FIG. 4, the tables of multiple stages can be combined to make a larger table. For example, if each stage contains W entries of B bit wide exact match table which can be partitioned into tables of width B/4, and the user wants a table of 10W entries and width B/4, that table can be created using two full Openflow match and action stages, which together provide 8W B/4 width entries, along with half of the capacity of the prior or subsequent stage to provide the other 2W entries, or ¼ of the capacity of the prior stage and ¼ the capacity of the subsequent stage.

In the case where a user has partitioned both the ternary 406 and exact match 404 stages by dividing them bitwise at B/4 intervals, it is possible to configure them as 8 separate Openflow tables. They all run concurrently, at the exact same time. However, the Openflow standard defines tables as a series of entities which operate sequentially. This means that the result of processing one table is made visible before processing the next table. There are three types of ways in which a table can be dependent on a prior table. First, a table may modify a field which is used as a match input to a subsequent table. This is called a match dependency. Second, a table may modify a field which is used as a data input to an action in a subsequent table. For example, one table may set the TTL (time to live) field in the IP header, and a subsequent table may decrement that TTL. That is called an action dependency. Third, the match output from each table specifies the index of the next table to execute. No next table means processing is done. If A, B and C are three successive tables, table A when executed can set the next table to B, C, a later table, or none. Only in the first case does table B get executed. So its execution is predicated on the successor indication from table A. This is called a successor dependency.

If a table has a match dependency on a prior table, it cannot be run concurrently with that table, and so cannot be placed in the same match and action stage as the prior table. It must be placed in a later stage. Likewise, if a table has an action dependency on a prior table, it cannot be run concurrently with the prior stage and must be placed in a later match and action stage.

If a table has a successor dependency on a prior stage, it is possible to resolve the dependencies within the logic pipeline of a single match and action stage, and therefore the table can be placed in the same match and action stage as the prior table and run concurrently. Table predication chaining logic is required to resolve the dependencies.

Generally, the type of dependencies between tables can be derived by examining the match input fields, modified output fields, and fields used to modify other fields of the tables. Alternately, the allowed sets for each of these can be declared in advance, and only conforming entries allowed into the table. For example, the fields used as match inputs in one table can be examined against modified output fields of prior tables to establish match dependencies. This information can be considered to be static and unchanging from packet to packet.

Figure 5A:
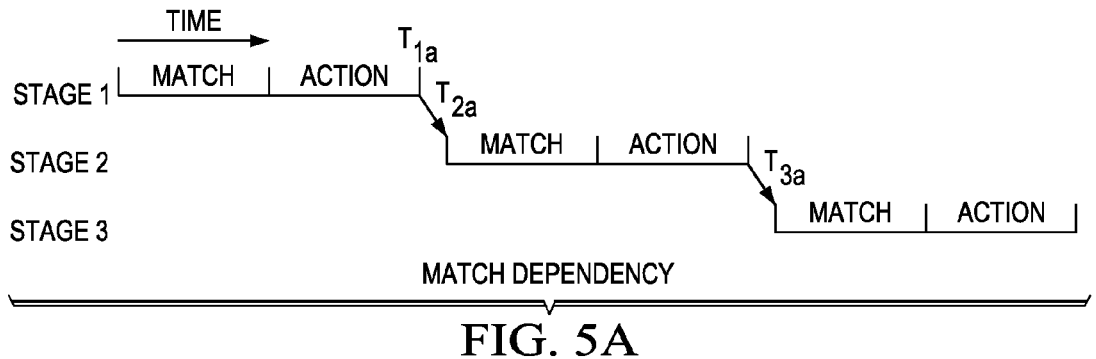
FIG. 5a is a timing diagram showing the timing of sending a packet through three stages when there are match dependencies between the stages according to embodiments of the invention.

Referring to FIG. 1, in a hardware implementation, each match and action stage 104, 106, 108, 130, 132 and 134 is implemented as a separate unit. Because of the physical size of each unit, some time is necessary to transport the packet field vector between units. For example, this transport delay may be one clock cycle. FIG. 5*a* shows the timing of sending a packet through three stages when there are match dependencies between the stages. The action result of the first stage is available at time t1*a*, and after transport delay the modified packet field vector arrives at the input of stage 2 at time t2*a*. Likewise, after the full processing delay of stage 2, and a transport delay, the packet field vector arrives at the input of stage 3 at t3*a*.

Figure 5B:
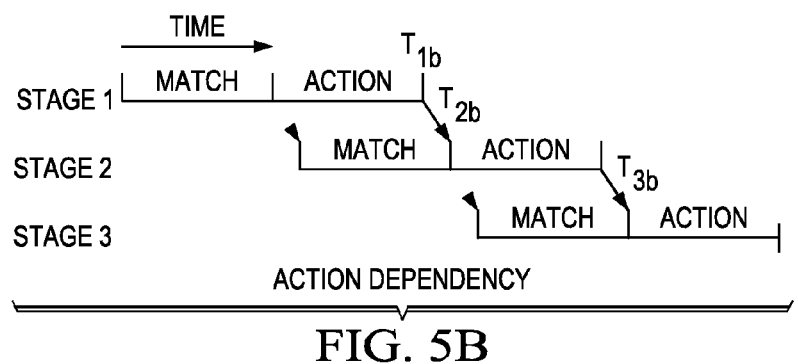
FIG. 5b is a timing diagram showing the timing of sending a packet through three stages when there are action dependencies between the stages according to embodiments of the invention.

In the case of an action dependency, the output result of a stage must be made available to the input of the next stage in time for it to be used by the action unit. In FIG. 5*b*, the result of stage 1's actions are available at time t1*b*, and after a transport delay are available at the input of stage 2's action unit at time t2*b*. Likewise, after stage 2's action processing and a transport delay the packet field vector is available at the action unit of stage 3 at time t3*b*.

Figure 5C:
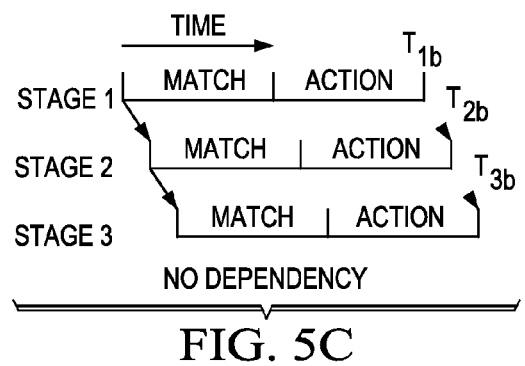
FIG. 5c is a timing diagram showing the timing of sending a packet through three stages when there are no dependencies between the stages according to embodiments of the invention.

In the case of no dependency, the separate stages are delayed in time from each other only by the transport delay, starting at t1*c*, t2*c* and t3*c* respectively, as shown in FIG. 5*c*.

Referring again to FIG. 5*c*, in the case of no dependency, the multiple stages are separated in time only by transport delay, and the input to stage 1 is also sent without modification to the inputs of stages 2 and 3. However, stage 1 modifies the packet field vector, and the result of that modification is sent on to stage 2, which further modifies the packet field vector and passes it on to stage 3 for its modifications. Generally, at stage 2, packet field vector slots which are modified are sourced from the stage 2 action unit, whereas slots which aren't modified are passed through from stage 1's output. This means there are two separate copies of the packet field vector passing between stages 1 and 2, or between any successive pair of stages. There is the copy going to the stage input, and the copy going from the stage output to the next stage's output, where it is merged with that next stage's packet field vector.

FIG. 5*b* shows that in the case of an action dependency, one copy of the packet field vector is broadcast to the stage inputs, while a second copy is sent from each stage's output to the input of the next stage's action unit. So when there is either a match or action dependency, two copies of the packet are sent between stages. FIG. 5*a* shows that in the case of a match dependency, only one copy is used.

Figure 6:
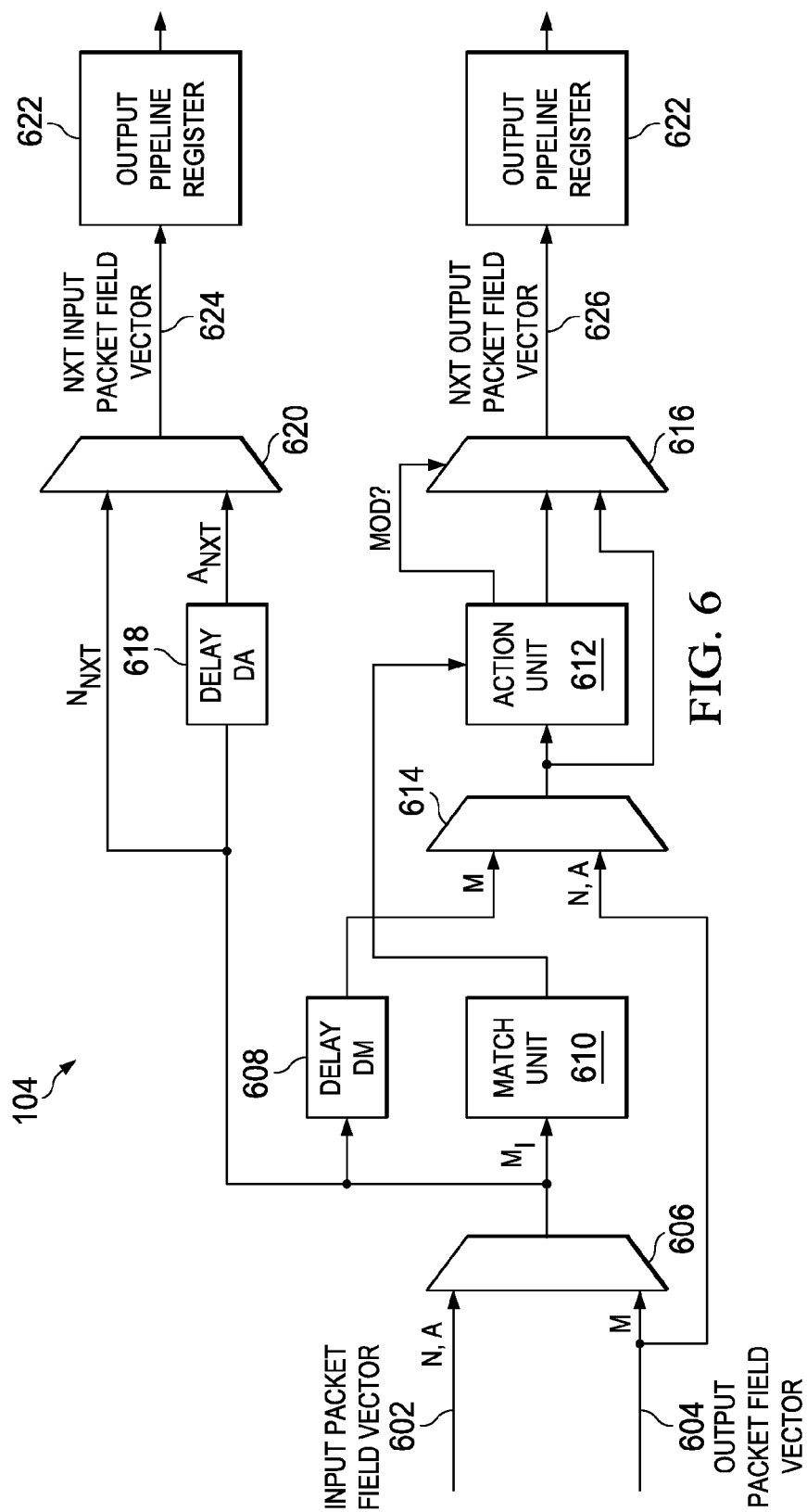
FIG. 6 is a logical diagram of a match and action stage illustrating how two copies of an input packet field vector and a output field vector are used according to embodiments of the invention.

FIG. 6 shows a logic diagram of a match and action stage showing how the two copies of the packet field vector, input 602 and output 604, are used. The two copies are input to the unit at the left, and two copies are produced at the right for input to the next unit. There is a match input multiplexer 606 providing the data input to the match unit. In the case of a match dependency, it chooses the output version from the previous stage, as indicated in FIG. 6 by the M on that mux input, otherwise it chooses the input version, consistent with the behavior of the diagrams of FIGS. 5*a-c*. This is indicated in FIG. 6 by N,A on the other mux input, for null or action dependencies. In the case of a match dependency, the match unit data input Mi is delayed by delay unit DM 608 by the same delay as the match unit 610, and that is selected as the data input to the action unit 612 by the action input mux 614. This is indicated in FIG. 6 by the M on that input to the action input mux 614. In the case of no or action dependencies (N or A at the action input mux 614 and match input mux in FIG. 6) the input mux 614 selects the input packet field vector 602 version, and the output packet field vector version 604 is passed to the action unit by the action mux 614. The action unit input can be directly bypassed around it to the next output packet field vector by the action output mux, so that unmodified fields go through with no delay. The action unit can modify fields, or in the case of an action dependency from the prior stage, send unmodified fields through the action unit 612 with the same delay that modified fields incur. Finally, the match unit input data Mi is sent to the next input packet field vector, either with no delay for no dependency to the next stage, or with delay DA 618 matching the action unit 612 in the case of an action dependency to the next stage. This is done by the nxt input mux 620. These dependencies are the dependencies of the next match and action stage relative to the current stage, whereas the dependencies for the other muxes are the dependencies of this stage upon the prior stage.

Transport delay can be allocated through incorporation of the output pipeline registers 622. With these present, successive tables with no dependencies would operate with one clock cycle additional delay apiece. More registers could be inserted in series for larger transport delay, or the registers removed for no additional clock cycles of transport delay. It is also possible to slide the registers back along the signal path to any set of locations which delays all the signals by a cycle, even back to the inputs. Or the registers could be split into latches. All of these pipelining techniques are known in the art.

The configuration of the muxes of FIG. 6 is set up based on analysis of table dependencies, and does not dynamically change per packet.

Figure 7:
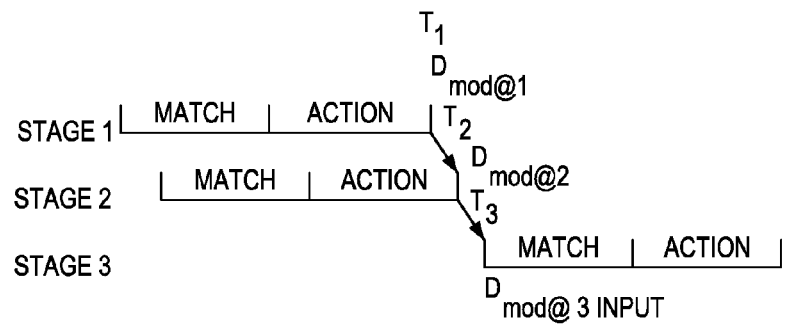
FIG. 7 is a timing diagram showing the timing of sending a packet through three stages according to embodiments of the invention.

More complex dependencies are possible, but in the implementation they reduce to the above described match, action and successor dependencies. Consider three successive match and action stages, A, B and C (not shown). There are no dependencies from A to B, none from B to C, but there is a match dependency from A to C, meaning though B does not match on a field that A modified, C does match on a field that A modified. The data modified by A arrives at the output of B one transport delay later than it would arrive at the input of B. Relative to the pipeline timing of B, this is exactly the same time it would arrive at B's output if it were modified by B instead of A. As a result, the dependencies required by the hardware are no dependency from A to B, but a match dependency from B to C. This is illustrated in FIG. 7. At time t1, the data modified by stage 1 Dmod@1 is at the output of stage 1. After a transport delay, at time t2 it arrives as Dmod@2 at the output of stage 2. After the additional transport delay between stages 2 and 3, it arrives at time t3 as Dmod@3input at the input of stage 3. If there were more than one stage between the two stages linked by a dependency, the dependent stage (stage 3 in the diagram) would still have the same match dependency to the prior stage. If the dependency were an action dependency instead, it would be configured with an action dependency delay from the prior stage. In general, the hardware capabilities of properly handling match and action dependencies to immediately prior stages also handle them to stages earlier in the pipeline.

Referring to FIG. 6, the first match and action stage in a pipeline operates by configuring its muxes in the same way it would for a match dependency to the prior stage. As a result, for the first stage, only one of the inputs to the match input multiplexer 606 is used, so only one signal need be provided and the match input multiplexer 606 may optionally be optimized out.

Referring back to FIG. 1, both the ingress 102 and egress 118 processors are implemented using Openflow match and action stages. If separate hardware is provided to implement each of the ingress 102 and egress 118 units, a decision must be made about how to partition the hardware between ingress 102 and egress 118. For example, they could have the same number of stages, or egress could have more stages, or more probably, since egress processing is usually less extensive than ingress processing, egress could have fewer stages. Or the table capacity of each stage could be different for ingress 102 and egress 118. But it is highly unlikely that a single partitioning decision will satisfy the varying needs of different customers. For that reason, ingress 102 and egress 118 hardware are merged in a way which allows the amount of resource devoted to each to be configurable by the user.

Figure 8:
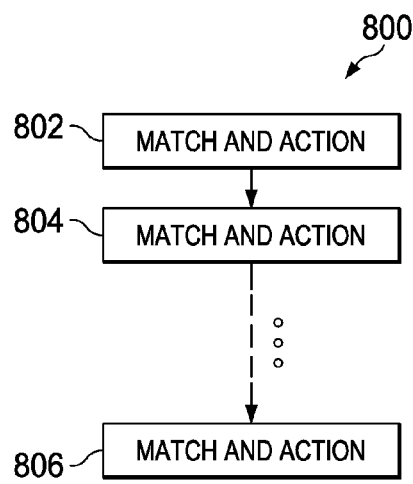
FIG. 8 is an electrical diagram, in block form, of a single match and action stage which can be used to implement both ingress and egress match and action pipelines according to embodiments of the invention.
Figure 9:
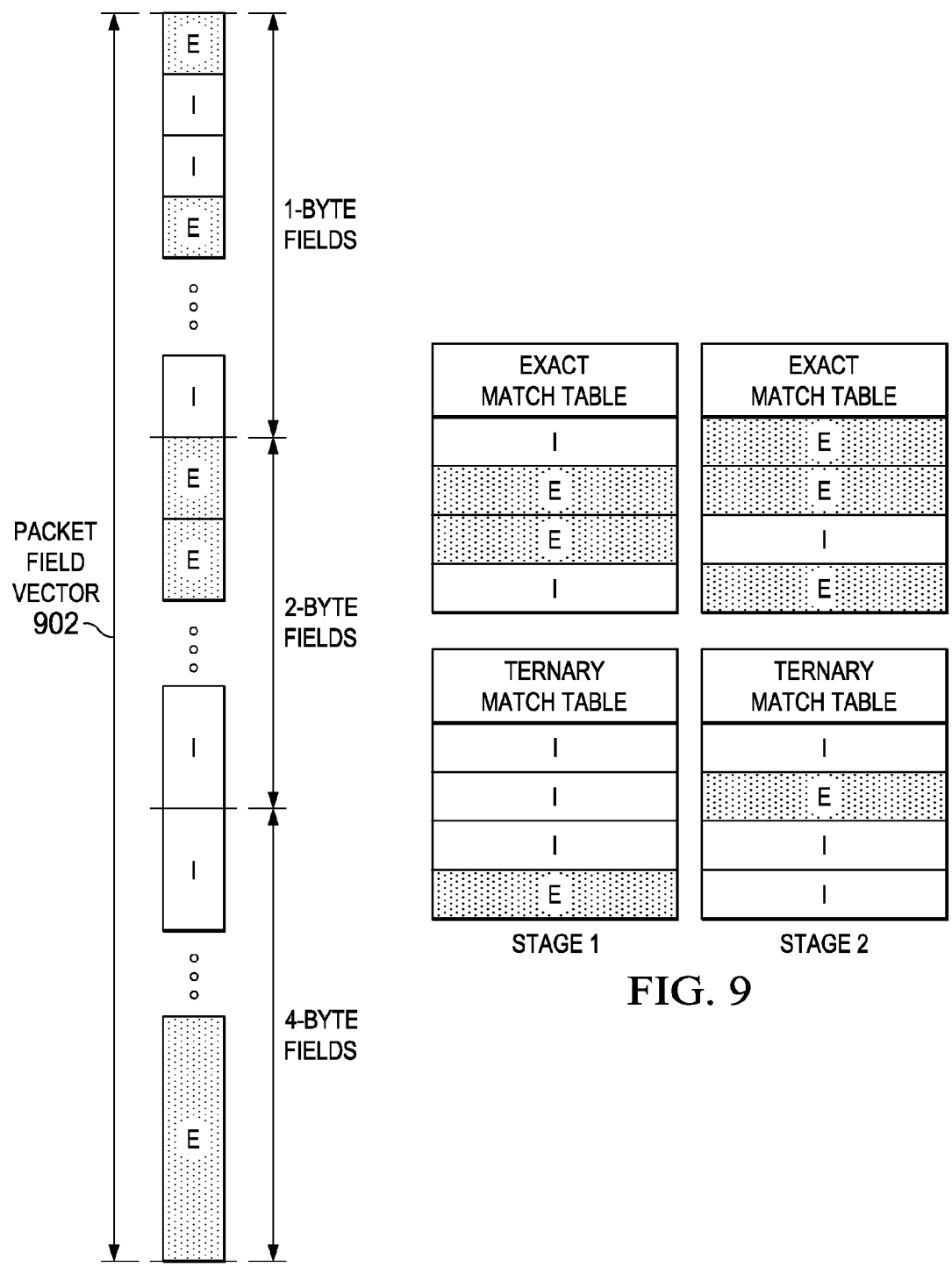
FIG. 9 is a block diagram illustrating how each table in each stage can be configured to belong to either ingress or egress according to embodiments of the invention.

FIG. 8 shows a single match and action pipeline which can be used to implement both the ingress and egress match and action pipelines. Externally, it simply appears as a single pipeline similar to the ingress 102 or egress 118 pipeline of FIG. 1. Recall that each Openflow match and action stage can implement a multiple of both exact and ternary match tables. Each individual table in each stage can be configured to belong to either ingress or egress, as illustrated in FIG. 9. Each of the slots of the packet field vector can also be configured to belong to either ingress I or egress E, as shown in FIG. 9. For correct operation, if a table is assigned to ingress I, its input crossbar (from FIG. 4) will be configured to only select slots from the packet field vector which are also assigned to ingress I. Likewise, if a table is assigned to egress E, its input crossbar will be configured to only select slots from the packet field vector which are assigned to egress E. Any table which is assigned to ingress I will have actions for its entries which only modify packet field vector slots assigned to ingress I. Likewise, any table which is assigned to egress E will have actions for its entries which only modify packet field vector slots assigned to egress.

Referring to FIG. 5, there can be different pipeline dependencies between stages, being either match, action or no dependency (table successor dependencies are grouped with no dependencies because they incur no clock cycle delay). These dependency configurations will be different for ingress and egress, creating different pipeline schedules for ingress and egress processing. Consider the muxes of FIG. 6, the match input multiplexer 606, action input mux 614, action output mux 616 and nxtinput mux 620, which are all configured differently to implement the various types of dependencies. There are two copies of each mux's control kept, one for ingress and one for egress, and the control of these muxes is separated for each slot of the packet field vector, with each slot's control choosing the ingress or the egress control value, according to whether that slot of the packet field vector belongs to ingress or egress.

Figure 10:
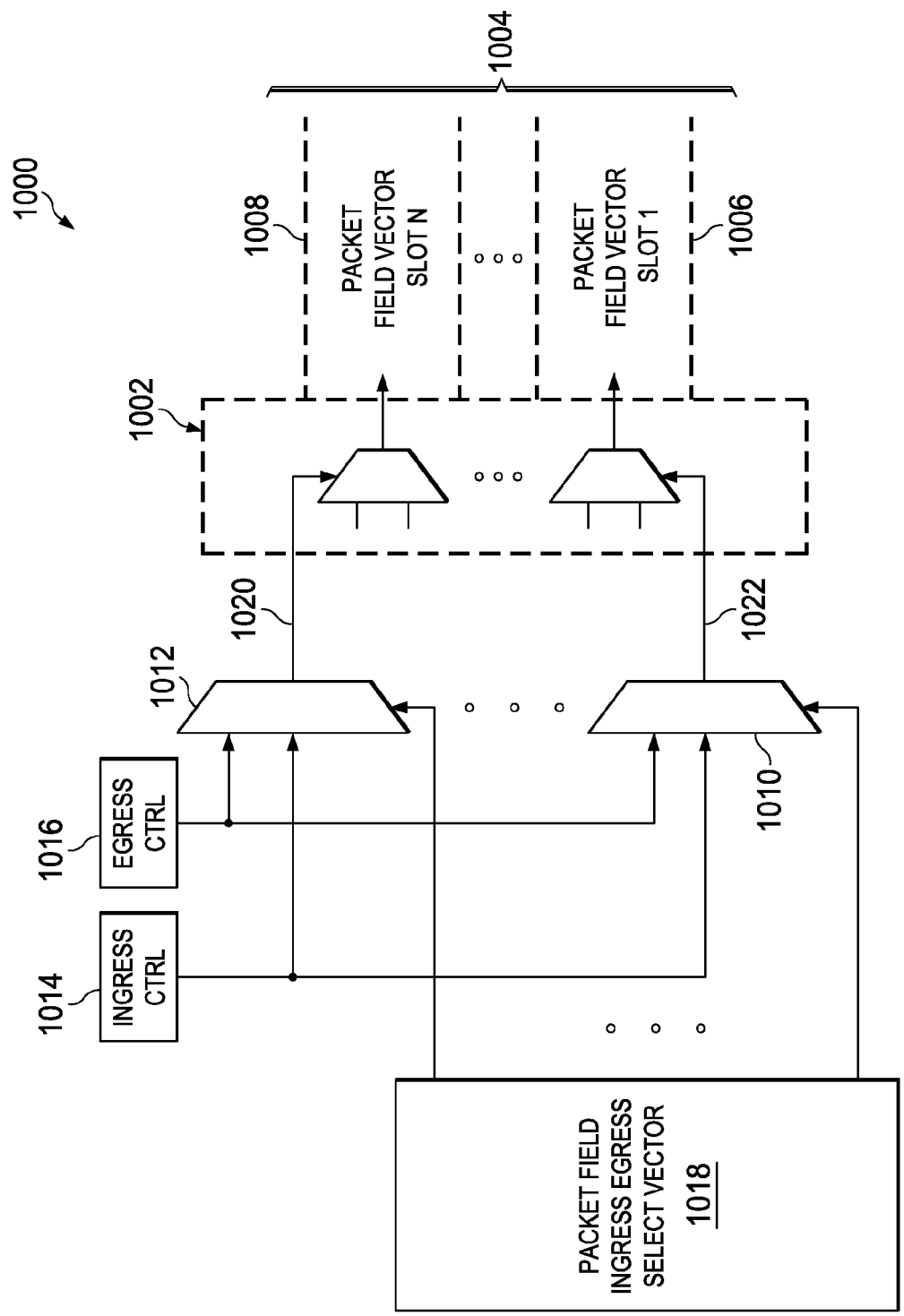
FIG. 10 is an electrical diagram, in block form, of logic used to control the match input multiplexer, the action input multiplexer, the action output multiplexer and the nxtinput multiplexer according to embodiments of the invention.

FIG. 10 shows a diagram of the logic 1000 to control the match input multiplexer 620, action input mux 614, action output mux 616 and nxtinput mux 620, which are referred to as the pipeline config mux in FIG. 10. The term pipeline config mux is meant to represent any of the muxes it refers to. The pipeline config mux 1002 switches data corresponding in width and function to the packet field vector 1004. The packet field vector 1004 is split into slots of varying width (for example, 1, 2 and 4 bytes). The pipeline config mux 1002 is likewise split into slots. The control for each slot comes from a mux control select multiplexer 1010 and 1012, which allows the control of the pipeline config mux 1002 to come from either ingress control values 1014 or egress control values 1016. The choice of ingress 1014 or egress 1016 control values is made on a per slot basis, controlled by the packet field ingress egress select vector 1018. This vector 1018 has one bit for each slot of the packet field vector, where each bit is set to one state to indicate the slot belongs to ingress, and to the other state to indicate that the slot belongs to egress.

Through the logic of FIG. 10, each pipeline config mux 1002 has separate control values for ingress and egress, and each slot of the mux has its control properly selected based on whether that slot belongs to ingress or egress.

Referring back to FIG. 6, output pipeline registers 1020 and 1022 are shown. These may be clocked every clock cycle, or as is commonly done in the art, they may have their clocks gated to only pulse in desired clock cycles, when data is flowing through the pipeline, and not pulse when there is no valid data to register. Since the ingress and egress pipelines proceed independently, generally the clock cycles where ingress data is present to be registered and the clock cycles where egress data is present to be registered are unrelated. As is standard with registers using gated clocks, there is a control signal to enable the clock. In this system, there are two separate control signals, one for ingress and one for egress. Like the pipeline config mux 1002 of FIG. 10, each slot of the output registers is controlled separately, being given a clock enable signal muxed from the ingress clock enable signal and the egress clock enable signal, where the control of that enable signal mux comes from the packet field ingress egress select vector (not shown).

As a result of the flexible assignment of tables to ingress or egress, the flexible assignment of packet field vector slots to ingress or egress, and the individual control of match and action unit muxes according to ingress or egress dependencies, the two different pipelines of data, ingress and egress, can individually flow through the single multiple stage pipeline unit of FIG. 8. A user definable amount and configuration of table resource can be assigned to each of ingress and egress, a user definable fraction of packet field vector capacity can be assigned to ingress and egress, and the two pipelines of data, ingress and egress, can each flow through the single hardware pipeline block 800 with latencies determined by their own table dependencies, completely independently and without any interaction between ingress and egress.

For example, further above and in FIG. 2 an implementation of Openflow ALL groups was described. It was stated that the egress pipeline 118 contains a table entry for each bucket of each ALL group. If this is the only egress processing, and the resulting ALL group egress flow table fits into a single match and action stage's match memory, it can be instantiated into any of the multiple stages of FIG. 8. All of the stages before and after would have no egress tables, and the egress table dependencies between stages would be set to none, resulting in an egress pipeline like FIG. 5a. The ALL group egress table could be put into any stage, and would be able to use holes in the space of table usage by ingress, allowing co-optimization of table usage between ingress and egress. Its also possible that the ALL group egress table could be split across multiple stages, either because it was too large to fit in a single stage or because the available holes in the table usage by ingress were small and scattered. These separate scattered subtables could be thought of as separate tables, which do no action if no match occurs, other than setting the next table executed to the next physical table used by the egress ALL group table.

The system has been described using exact and ternary match tables, but the inventive description should not be interpreted as being limited to those table types. Additional table types, such as range matching TCAM and longest prefix match are also possible.

The foregoing description has been presented for purposes of illustration and description. It is not intended to be exhaustive or to limit the invention to the precise form disclosed, and other modifications and variations may be possible in light of the above teachings. The embodiments were chosen and described in order to best explain the applicable principles and their practical application to thereby enable others skilled in the art to best utilize various embodiments and various modifications as are suited to the particular use contemplated. It is intended that the appended claims be construed to include other alternative embodiments except insofar as limited by the prior art.

What is claimed is:

1. A hardware switch comprising:
   a first multiplexer having a plurality of input ports and an output port;
   an ingress processor having an input port coupled to the output port of the first multiplexer;
   a common data buffer having a first input port coupled to the output port of the first multiplexer, a second input and an output port;
   a first packet pointer having an input port coupled to the output port of the first multiplexer and an output port;
   a plurality of queues having input ports coupled to the output port of the first packet pointer and an output port;
   a second packet pointer having an input port coupled to the output port of the plurality of queues and an output coupled to the second input of the common data buffer;
   an egress processor having an input port coupled to the output port of the common data buffer and an output port;
   a second multiplexer having an input coupled to the output port of the egress processor and a plurality of output ports;
   a memory wherein an egress Openflow table and an ALL group bucket table are stored in the memory;
   Openflow ALL groups wherein the Openflow ALL groups comprise: ALL group buckets;
   wherein ALL group buckets are represented in ingress as a list of output ports with associated queue ID's and associated copy-counts;
      wherein each ALL group bucket is represented in egress by the egress Openflow table entry wherein the egress Openflow table entry matches a group ID and a bucket ID; and
      wherein an action entry in the ALL group bucket table entry is the set of actions in the Openflow ALL group bucket excluding an output port and queue assignment.

2. The hardware switch of claim 1 wherein the bucket ID is a bucket number.

3. The hardware switch of claim 1 wherein the bucket ID is a output port number and a port-index-ID.

4. The hardware switch of claim 1 wherein a packet pointer and a copy-count field are enqueued at each output port of an Openflow ALL group once per packet.

5. The hardware switch of claim 4 wherein the egress processor reads the copy-count field; wherein the egress processor outputs a packet to a queue's port a number of times specified by copy-count field before retiring a packet pointer from the head of the queue.

6. The hardware switch of claim 1 wherein the Openflow ALL groups are egress Openflow tables; wherein an ALL group egress table uses a shared pool of table resources with other egress Openflow tables.

7. The hardware switch of claim 1 wherein the egress Openflow tables and ingress Openflow tables share common table resources; wherein an egress ALL group table uses the common table resources.

8. The hardware switch of claim 6 where the pool of table resources comprises memory for storing matches and actions.

* * * * *